(12) United States Patent  
Canham

(10) Patent No.: US 9,119,277 B2
(45) Date of Patent: Aug. 25, 2015

(54) PASSIVE CHARGE NEUTRALIZATION SYSTEM FOR MITIGATING ELECTROSTATIC DISCHARGE IN SPACE

(71) Applicant: Orbital ATK, Inc., Dulles, VA (US)

(72) Inventor: John S. Canham, Ellicott City, MD (US)

(73) Assignee: Orbital ATK, Inc., Dulles, VA (US)

( * ) Notice: Subject to any disclaimer, the term of this patent is extended or adjusted under 35 U.S.C. 154(b) by 0 days.

(21) Appl. No.: 13/777,732

(22) Filed: Feb. 26, 2013

(65) Prior Publication Data

US 2014/0240887 A1 Aug. 28, 2014

(51) Int. Cl.
| | |
|---|---|
| *H05F 3/00* | (2006.01) |
| *H05F 3/04* | (2006.01) |
| *H05F 3/06* | (2006.01) |
| *B64D 45/02* | (2006.01) |

(52) U.S. Cl.
CPC . *H05F 3/06* (2013.01); *B64D 45/02* (2013.01)

(58) Field of Classification Search
CPC ........ B60R 16/06; B64D 45/02; H01T 23/00; H02H 9/046; H05F 3/04; H05F 3/06; H05F 1/00–1/02
USPC ........... 361/56, 213, 215, 230, 231, 216–218, 361/212
See application file for complete search history.

(56) References Cited

U.S. PATENT DOCUMENTS

| | | | | |
|---|---|---|---|---|
| 4,208,132 | A * | 6/1980 | Stevens | 366/101 |
| 4,800,281 | A * | 1/1989 | Williamson | 250/427 |
| 5,296,272 | A * | 3/1994 | Matossian et al. | 427/523 |
| 6,577,130 | B1 * | 6/2003 | Adamo et al. | 324/348 |
| 8,264,811 | B1 * | 9/2012 | Green | 361/212 |

OTHER PUBLICATIONS

Industrial Molding Supplies, COBRA™ Static Neutralizing Air Gun Item No. 130679, Copyright 2009, [online], [retrieved on Jul. 2, 2013] Retrieved from the IMS Company website < www.imscompany.com>, 2 pages.

* cited by examiner

*Primary Examiner* — Thienvu Tran
*Assistant Examiner* — Christopher Clark
(74) *Attorney, Agent, or Firm* — TraskBritt

(57) ABSTRACT

A charge-neutralization system is provided. The charge-neutralization system includes a reservoir, a plasma generator and a flow-restricting transfer line. The reservoir is configured to hold matter to be ionized under pressure. The plasma generator is configured and arranged to create a neutral energy plasma on a vehicle from the matter to be ionized. The flow-restricting transfer line provides a fluid communication between the reservoir and the plasma generator.

20 Claims, 5 Drawing Sheets

PASSIVE CHARGE NEUTRALIZATION SYSTEM FOR MITIGATING ELECTROSTATIC DISCHARGE IN SPACE

BACKGROUND

Spacecraft that are in space are subject to a number of processes that result in a significant electrostatic charging. In the case of rendezvous and proximity operations of one or more spacecraft with one or more other bodies in space, a potential difference can exist between objects, which results in variable levels of electrostatic attractions and repulsions that can result in an electrostatic discharge. Electrostatic attraction and repulsion will result in non-linear forces that will increase the difficulty of the rendezvous and proximity operations. The electrostatic discharge due to the net charge difference between the spacecraft and the other body may or may not result in a larger discharge driven by the electrical system of one or more of the spacecraft. In either case, electrostatic discharge can result in problems with the spacecraft's electronics. Through operations on the ground, virtually all spacecraft quality assurance and safety requirements include protection against electrostatic discharge to prevent electrostatic discharge damage. In the case of the International Space Station, this issue was identified in a subsequent study that was carried out to investigate the risk to astronauts carrying out extra-vehicle activities. The result was that under certain conditions, the discharge of up to 10,000 Amps at 160 V was possible. In the testing of the impact of the size of discharge, an entire spacesuit was melted into a puddle on the bottom of the test chamber. As a result of this test, triply redundant microwave driven xenon plasma charge couplers were installed on the space station.

For the reasons stated above and for other reasons stated below, which will become apparent to those skilled in the art upon reading and understanding the present specification, there is a need in the art for an effective and efficient system for spacecraft to mitigate the charge differences between spacecraft, the surrounding plasma and another body.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a charge-neutralization system is provided. The charge-neutralization system includes a reservoir, a plasma generator and a flow-restricting transfer line. The reservoir is configured to hold matter to be ionized under pressure. The plasma generator is configured and arranged to create neutral low-energy plasma on the vehicle with the matter to be ionized. The flow-restricting transfer line provides a fluid communication between the reservoir and the plasma generator.

In another embodiment, a spacecraft with a charge-neutralization system is provided. The charge-neutralization system includes a reservoir, a plasma generator, a flow-restricting transfer line and a ground plate. The reservoir is configured to hold matter to be ionized under pressure. The plasma generator is configured and arranged to generate neutral low-energy plasma with the matter to be ionized. The flow-restricting transfer line provides a fluid communication between the reservoir and the plasma generator. The ground plate is coupled to the spacecraft. The plasma generator is positioned to apply the generated neutral low-energy plasma to the ground plate of the spacecraft.

In still another embodiment, a method of neutralizing electrostatic discharge on a spacecraft is provided. The method includes: generating neutral low-energy plasma and applying the neutral low-energy plasma to the spacecraft to level an electrostatic charge difference between the spacecraft and another object.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout the figures and text.

DETAILED DESCRIPTION

In the following detailed description, reference is made to the accompanying drawings, which form a part hereof and in which is shown by way of illustration, specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a radioisotope electrostatic charge neutralizer. Matter to be ionized, such as volatile gas, is directed into an ionizing source such as a plasma generation source volume (generally referred to herein as a "plasma generator"). Ionizing radiation from a radioisotope in the plasma generator ionizes the volatile gas creating a neutralizing plasma. The radioisotopic electrostatic charge neutralizer provides a source of neutral low-energy plasma for leveling the electrostatic charge between the spacecraft and another object. Charged particles are attracted to electrostatic fields based upon the relative charge difference, a positively charged spacecraft approaching a negatively charged space object results in electrons from the radioisotopic-generated plasma to be attracted to the positively charged spacecraft, and the positively charged ions will be attracted to the negatively charged other body. This results in a small current that will safely decrease the charge difference between the bodies. This process is self-controlling due to the inherent attraction of electrostatic charge particles being attracted to the one body and repelled from the other body in the case of a charge difference. Depending upon the duration of the mission, the amount of charge that will need to be dissipated and the cost of the gas being used to neutralize the charge at the rate desired, it may or may not be necessary to provide a dynamic control of gas flow rate. If the rate of charge dissipation is achieved with a gas flow on the order of 1 E-3 standard cubic centimeters per second or less, it may be advantageous to provide gas flow through a fixed-rate leak, which would not require any controls. If higher flow rates result in gas flow rates that would require too much gas to be used, valve control may be required to conserve gas. In either case, flowing gas through the radioisotope-based ionizer (plasma generator) will result in charge neutralization between closely surrounding bodies.

Figure 1A:
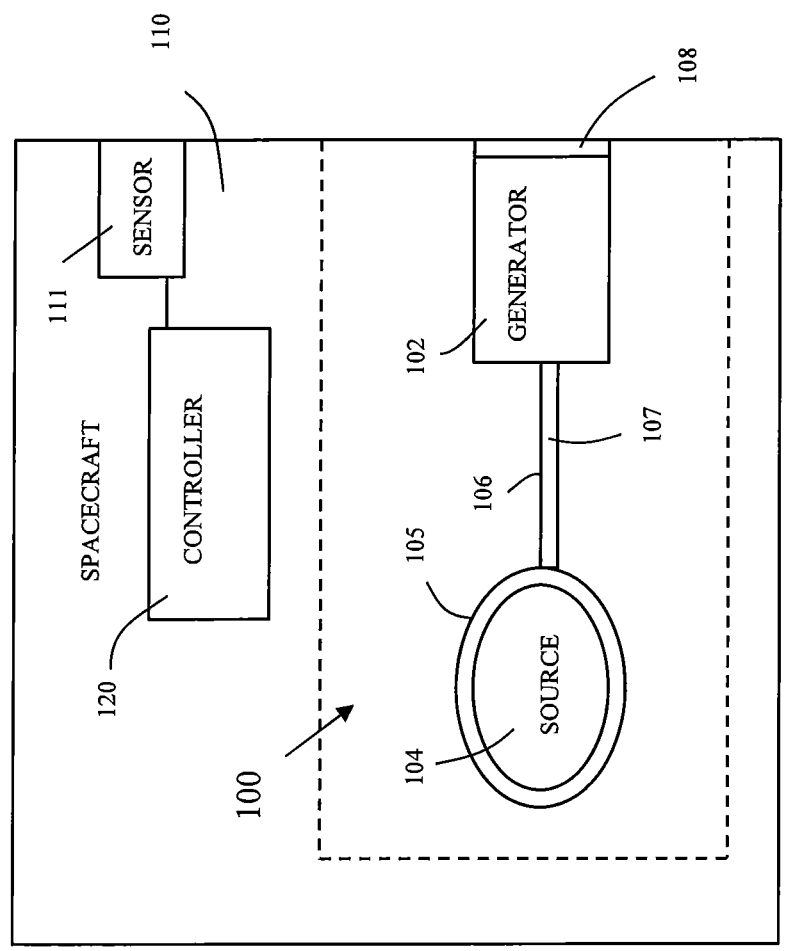
FIG. 1A is a diagram of a spacecraft with a charge-neutralization system of an embodiment of the present invention.
Figure 1B:
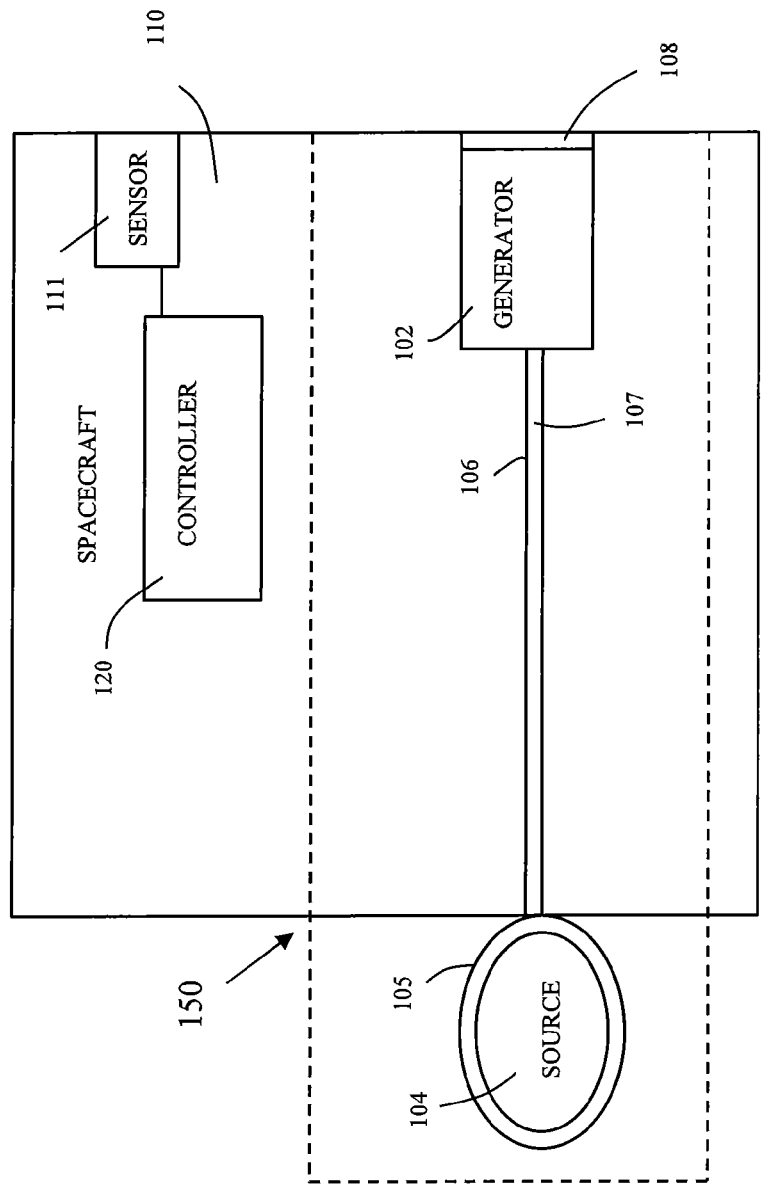
FIG. 1B is a diagram of a spacecraft with another charge-neutralization system of an embodiment of the present invention.

Referring to FIG. 1A, a block diagram illustrating a first embodiment of a passive charge-neutralization system 100 that mitigates electrostatic discharge associated with a spacecraft 110 is provided. This embodiment would be used when the duration of the flight is not long and the cost of gas is not prohibitive in letting the system constantly run during the flight. The charge-neutralization system 100 includes a volatile liquid/gas 104 (matter to be ionized) such as, but not limited to, xenon stored in a pressurized reservoir 105. The liquid/gas 104 flows through a restricting transfer line 106. In the restricting transfer line 106, any remaining liquid evaporates to gas 107. The restricting transfer line 106 delivers the volatile gas 107 to a plasma generator 102. The plasma generator 102 (plasma generation source volume) generates a neutralizing plasma with the volatile gas 107 (matter to be ionized). That is, the ionizing radiation of the radioisotope in the plasma generator 102 ionizes the volatile gas 107 to generate the neutralizing plasma. The plasma generator 102 is electrically bonded to a ground plate 108 of the spacecraft 110. This embodiment also illustrates an electrostatic charge sensor 111 that detects electrostatic charge on the spacecraft 110. The electrostatic charge sensor 111 is in communication with a controller 120. The controller 120 may be a guidance navigation control system of the spacecraft. The controller 120 monitors the electrostatic charge of the spacecraft 110 through the electrostatic charge sensor 111 and uses the information during operations. FIG. 1B illustrates another charge-neutralization system 150. In this system, the reservoir 105 that contains the matter to be ionized 104 is mounted outside the spacecraft 110. Moreover, it is possible to mount the entire system outside the spacecraft.

Figure 2:
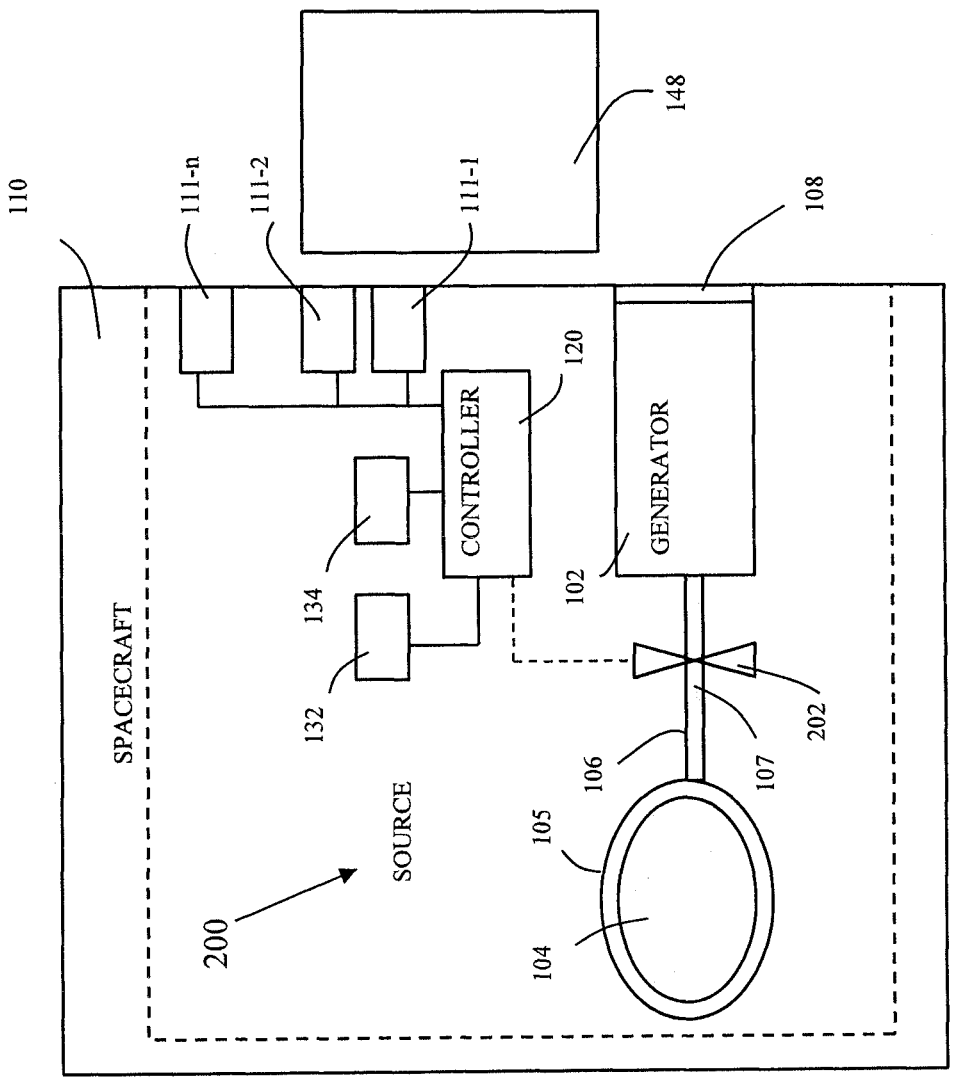
FIG. 2 is a diagram of a spacecraft with yet a different charge-neutralization system of another embodiment of the present invention.

FIG. 2 illustrates an embodiment of a passive charge-neutralization system 200 that would be applied to longer missions or where it is important to conserve the volatile liquid/gas 104/107. In this embodiment, instead of delivering a constant flow of volatile gas 107 from the pressurized reservoir 105 to the plasma generator 102, a valve 202, positioned in the restricting transfer line 106, selectively turns on and turns off the flow. In this embodiment, the controller 120 is operationally coupled to the valve 202 to activate the valve 202 between an open and closed position. The controller 120 may control the valve 202 to conserve the volatile material 104/107 based on different trigger systems. The controller 120 may be part of the guidance and navigation control system of the spacecraft 110. Moreover, the controller 120 may be a simple switch or a processing device that dynamically controls the valve 202 based on events. For example, one or more electrostatic charge sensors 111-1, 111-2 and 111-$n$ may be used to detect the electrostatic charge on the spacecraft 110, or between the spacecraft 110 and another body 148 as the other body 148 gets close to the spacecraft 110. When an electrostatic charge level is detected that is beyond a set limit, the controller 120, based on the measured electrostatic charge by the one or more sensors 111-1, 111-2 or 111-$n$, opens the valve 202 until an electrostatic charge level is below the set limit. In another example, the passive charge-neutralization system 200 may include a timer 132. The controller 120, in this embodiment, would periodically open and close the valve 202 based on the timer 132. In still another embodiment, the passive charge-neutralization system 200 would include an input system 134 that would provide a signal to the controller 120 that an event (such as docking with another object or a spacewalk by an astronaut) is about to occur. Based on a signal from the input system 134, the controller 120 would control the valve 202.

Figure 3:
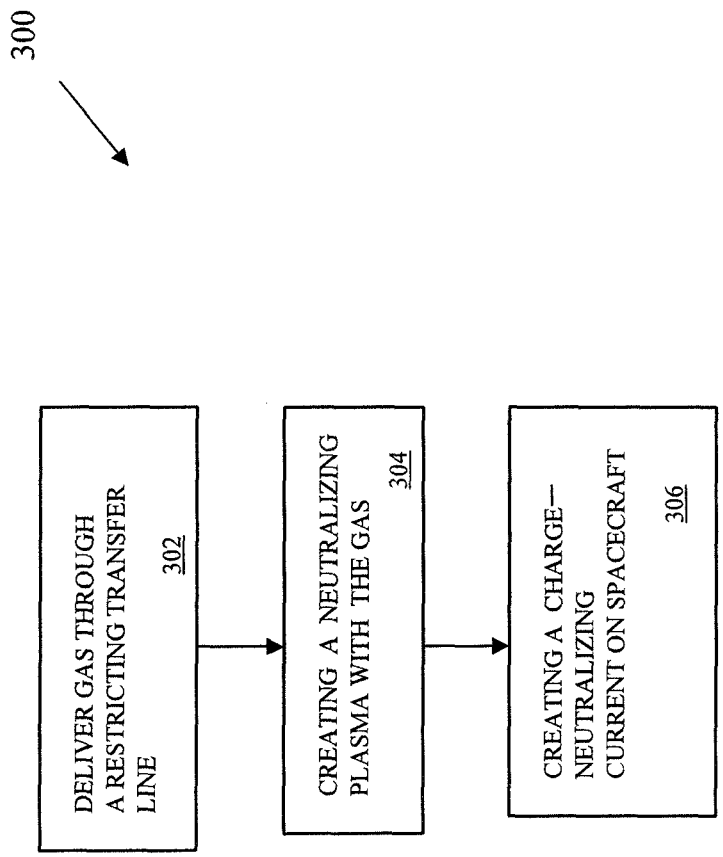
FIG. 3 is a short mission operational flow diagram of one embodiment of the present invention.

FIG. 3 illustrates a short mission operational flow diagram 300. As illustrated, the process starts by delivering volatile gas 107 (matter to be ionized) through a restricting transfer line to plasma generator 102 (302). As discussed above, the volatile liquid/gas 104 that is held in a pressured reservoir 105 is delivered as a gas 107 to the plasma generator 102 through the restricting transfer line 106. The plasma generator 102 then creates a neutralizing plasma from the material to be ionized, volatile liquid/gas 104 (304). The plasma generator 102 uses ionizing radiation from the radioisotope, ionizing the matter to be ionized to create the neutralizing plasma that is applied to the ground plate 108 of the spacecraft 110. The neutralizing plasma of the plasma generator 102 creates a charge-neutralizing current on the spacecraft (306). In particular, as discussed above, as charged particles are attracted to electrostatic fields based upon the relative charge difference, a positively charged spacecraft approaching a negatively charged second object will result in electrons from the radioisotopic-generated plasma to be attracted to the spacecraft, and the positively charged ions will be attracted to the negatively charged other body. This results in a small current that will safely decrease charge difference between the bodies.

Figure 4:
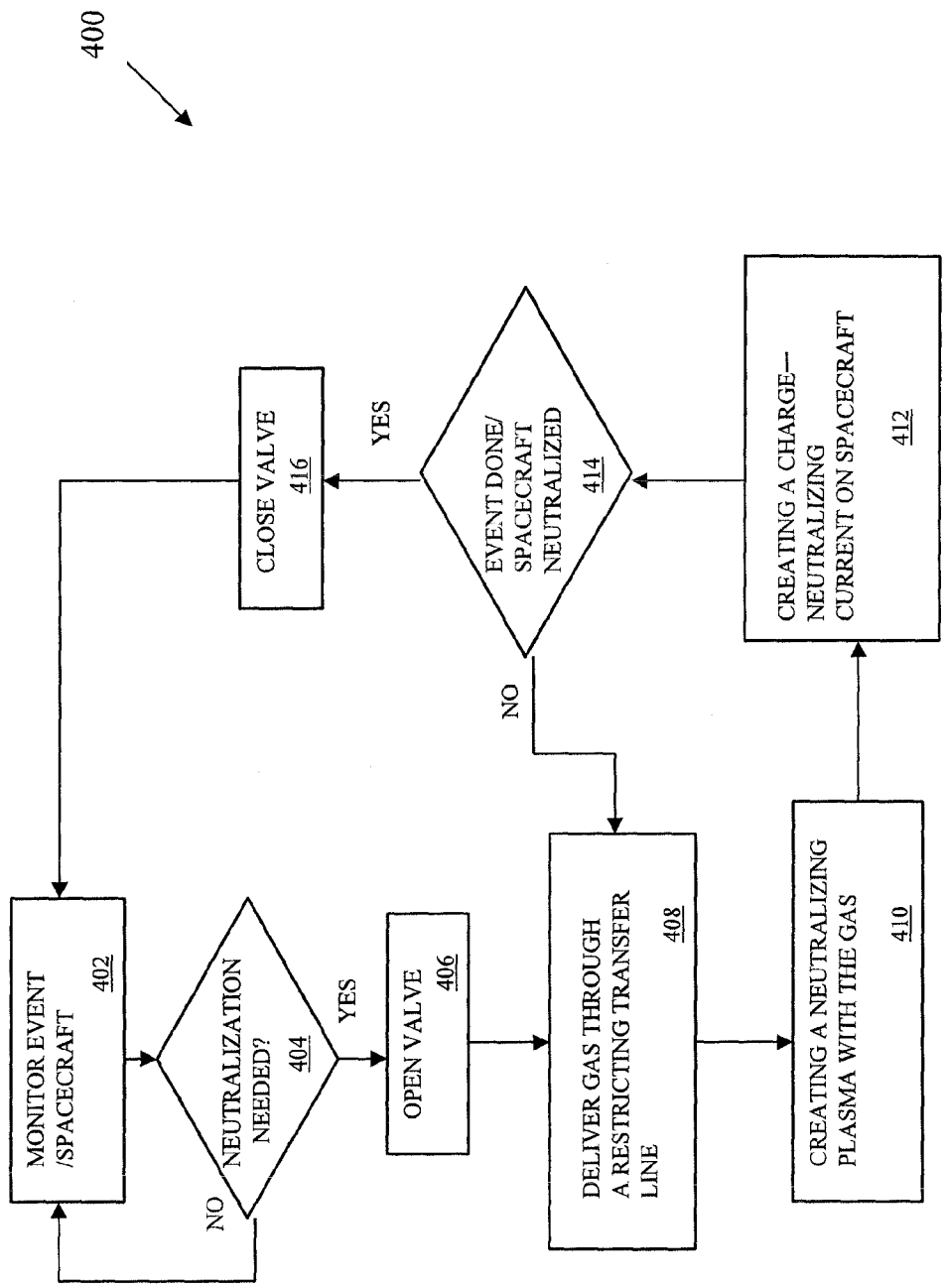
FIG. 4 is a long mission operational flow diagram of an embodiment of the present invention.

FIG. 4 illustrates a long mission operational diagram 400 of one embodiment. In this embodiment, the spacecraft 110 is monitored (402). In one embodiment, the spacecraft 110 is monitored for the buildup of electrostatic charge. In another embodiment, the spacecraft 110 is monitored for a future event such as docking with another object (such as another spacecraft, satellite, etc.) or a planned space walk by an astronaut. If it is determined that a neutralization of charge is not needed (404), the process continues monitoring at step (402). If it is determined that a neutralization of charge is needed (404), valve 202 is opened (406). Once the valve 202 is opened, gas 107 is delivered through the restricting transfer line 106 (408). The plasma generator 102 then creates a neutralizing plasma with the volatile gas 107 (410). The neutralizing plasma is applied to the spacecraft 110 to create a charge-neutralizing current (412). It is then determined if the event is done or the electrostatic charge on the spacecraft has been neutralized (414). For example, the system may monitor for an indication that the event has been completed (i.e., the object has completed the docking process or the astronaut has returned to the spacecraft) or whether the electrostatic charge has been neutralized. If the event is not completed or the spacecraft 110 has not been neutralized (414), the valve 202 remains open so the gas continues to be delivered to the plasma generator at step (408). If the event has been completed or it is determined that the spacecraft has been neutralized (414), the valve 202 is closed (416). Closing the valve 202 conserves the liquid/gas source 104 in the reservoir 105. Once the valve 202 is closed at step (416), the process continues by monitoring for an event or buildup of electrostatic charge at step (402).

The above-described charge-neutralization system is relatively inexpensive to build while its minimal size, weight and power consumption is ideal for implementation in a spacecraft. Moreover, because the radioisotope electrostatic charge neutralizer is primarily passive and is based on the fundamental properties of two materials (i.e., the ionizing radiation from the radioisotope of the plasma generator and the volatile gas), there are very few possible failure opportunities.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A charge neutralization system comprising:
a reservoir mounted outside a spacecraft and configured to hold a volatile gas under pressure;
a flow restricting transfer line positioned and configured to receive the volatile gas from the reservoir; and
a radioisotope-based plasma generator positioned and configured to receive the volatile gas from the flow restricting transfer line, to ionize the volatile gas with ionizing radiation from a radioisotope to form a radioisotopic-generated plasma, and to apply the radioisotopic-generated plasma to the spacecraft to form a charge neutralizing current on the spacecraft.

2. The charge neutralization system of claim 1, further comprising a valve in communication with the flow restricting transfer line, the valve configured and arranged to selectively pass the volatile gas to the plasma generator.

3. The charge neutralization system of claim 2, wherein the valve is operatively associated with a guidance and navigation control system of the spacecraft.

4. The charge neutralization system of claim 1, wherein the radioisotope-based plasma generator is positioned and configured to direct the radioisotopic-generated plasma to a ground plate of the spacecraft.

5. The charge neutralization system of claim 1, wherein the volatile gas is xenon, and the flow restricting transfer line provides a fixed-rate leak equal to or less than 1 E-3 standard cubic centimeters per second.

6. A spacecraft comprising:
an outside surface;
a ground plate coupled to the outside surface; and
a charge neutralization system comprising:
a reservoir mounted on the outside surface and configured to hold a volatile gas under pressure;
a flow restricting transfer line positioned and configured to receive the volatile as from the reservoir; and
a radioisotope-based plasma generator positioned and configured to receive the volatile gas from the flow restricting transfer line, to ionize the volatile gas with ionizing radiation from a radioisotope to form a radioisotopic-generated plasma, and to apply the radioisotopic-generated plasma to the ground plate to form a charge neutralizing current.

7. The spacecraft of claim 6, further comprising a valve in communication with the flow restricting transfer line and configured to selectively pass the volatile gas to the radioisotope-based plasma generator.

8. The spacecraft of claim 7, further comprising a guidance and navigation control system operatively associated with the valve and configured to activate the valve between open and closed positions.

9. The spacecraft of claim 8, further comprising at least one of an electrostatic charge sensor and an input system positioned and configured to send signals to the guidance and navigation control system for activating the valve between the open and closed positions.

10. The spacecraft of claim 7, wherein the volatile gas is xenon.

11. A method of neutralizing electrostatic charge on a spacecraft, the method comprising:
directing a volatile gas from a reservoir mounted outside the spacecraft, through a flow restricting transfer line, and into a radioisotope-based plasma generator;
ionizing the volatile gas within the radioisotope-based plasma generator using ionizing radiation from a radioisotope to produce a radioisotopic-generated plasma; and
directing the radioisotopic-generated plasma from the radioisotope-based plasma generator to another portion of the spacecraft to level an electrostatic charge difference between the spacecraft and another object.

12. The method of claim 11, wherein directing a volatile gas from a reservoir mounted outside the spacecraft, through a flow restricting transfer line, and into a radioisotope-based plasma generator comprises flowing the volatile gas at a fixed-rate less than or equal to 1 E-3 standard cubic centimeters per second.

13. The method of claim 12, further comprising regulating the flow of the volatile gas through the flow restricting transfer line with a valve.

14. The method of claim 13, further comprising controlling the valve with a guidance and navigation control system of the spacecraft to selectively conserve the volatile gas.

15. The method of claim 14, further comprising signaling the guidance and navigation control system of the spacecraft to open the valve using at least one of an electrostatic charge sensor and an input system.

16. The method of claim 15, wherein signaling the guidance and navigation control system of the spacecraft to open the valve comprises signaling the guidance and navigation control system of the spacecraft to open the valve prior to bringing the spacecraft and an oppositely charged object proximate one another.

17. The method of claim 13, further comprising timing the operation of the valve.

18. The method of claim 11, wherein directing the radioisotopic-generated plasma from the radioisotope-based plasma generator to another portion of the spacecraft comprises applying the radioisotopic-generated plasma to a ground plate of the spacecraft.

19. The charge neutralization system of claim 1, wherein the radioisotope-based plasma generator is mounted outside the spacecraft.

20. The spacecraft of claim 6, wherein an entirety of the charge neutralization system is mounted on the outside surface.

* * * * *

UNITED STATES PATENT AND TRADEMARK OFFICE
CERTIFICATE OF CORRECTION

PATENT NO. : 9,119,277 B2
APPLICATION NO. : 13/777732
DATED : August 25, 2015
INVENTOR(S) : John S. Canham Page 1 of 1

It is certified that error appears in the above-identified patent and that said Letters Patent is hereby corrected as shown below:

On the title page:
In ITEM (54) TITLE:         change "CHARGE NEUTRALIZATION" to --CHARGE-NEUTRALIZATION--

In the specification:
COLUMN 1,  LINE 1,          change "CHARGE NEUTRALIZATION" to --CHARGE-NEUTRALIZATION--

In the claims:
CLAIM 6,  COLUMN 5,  LINE 52,  change "volatile as" to --volatile gas--

Signed and Sealed this
Second Day of February, 2016

Michelle K. Lee
*Director of the United States Patent and Trademark Office*